(12) United States Patent
Schroeder et al.

(10) Patent No.: US 11,919,245 B2
(45) Date of Patent: Mar. 5, 2024

(54) SYSTEMS AND METHODS FOR ADDITIVELY MANUFACTURING CALORIC MICROSTRUCTURES

(71) Applicants: Haier US Appliance Solutions, Inc., Wilmington, DE (US); UT-Battelle, LLC, Oak Ridge, TN (US)

(72) Inventors: Michael Goodman Schroeder, Louisville, KY (US); Amelia McDow Elliott, Knoxville, TN (US); Ayyoub Mehdizadeh Momen, Knoxville, TN (US)

(73) Assignees: Haier US Appliance Solutions, Inc., Wilmington, DE (US); UT-Battelle, LLC, Knoxville, TN (US)

( * ) Notice: Subject to any disclaimer, the term of this patent is extended or adjusted under 35 U.S.C. 154(b) by 245 days.

(21) Appl. No.: 16/996,273

(22) Filed: Aug. 18, 2020

(65) Prior Publication Data
US 2022/0055308 A1    Feb. 24, 2022

(51) Int. Cl.
| | |
|---|---|
| *B29C 64/393* | (2017.01) |
| *B29C 64/124* | (2017.01) |
| *B22F 10/31* | (2021.01) |
| *B22F 10/38* | (2021.01) |
| *B22F 12/00* | (2021.01) |

(Continued)

(52) U.S. Cl.
CPC ............ *B29C 64/393* (2017.08); *B22F 10/31* (2021.01); *B22F 10/38* (2021.01); *B22F 12/00* (2021.01); *B29C 64/124* (2017.08); *B29L 2031/18* (2013.01); *B33Y 10/00* (2014.12); *B33Y 30/00* (2014.12); *B33Y 50/00* (2014.12); *B33Y 50/02* (2014.12); *B33Y 80/00* (2014.12)

(58) Field of Classification Search
CPC ... B29C 64/393; B29C 64/124; B29C 64/386; B22F 10/31; B22F 12/00; B22F 10/38; B33Y 10/00; B33Y 30/00; B33Y 50/00; B29L 2031/18
See application file for complete search history.

(56) References Cited

U.S. PATENT DOCUMENTS

| | | |
|---|---|---|
| 8,775,134 B2 | 7/2014 | Gielis |
| 9,026,407 B1 | 5/2015 | Kennefick |

(Continued)

OTHER PUBLICATIONS

Peyre et al. (Simplified numerical model for the laser metal deposition additive manufacturing process—Journal of Laser Applications—vol. 29, n°2, p.Article No. 022304-2017). (Year: 2017).*

*Primary Examiner* — Ricardo D Morales
(74) *Attorney, Agent, or Firm* — Dority & Manning, P.A.

(57) ABSTRACT

A method for additively manufacturing a microstructure from a caloric material includes providing a geometry of the microstructure to a processor of an additive manufacturing device, the geometry defining a plurality of microfeatures of the microstructure. The method also includes generating, via the processor, a three-dimensional (3D) model representative of the geometry of the microstructure, wherein one or more of the plurality of microfeatures are represented in the 3D model by a non-arcuate profile. Further, the method includes printing, via the additive manufacturing device, the microstructure from the caloric material according to the 3D model. As such, the non-arcuate profile reduces a file size of the 3D model as compared to an arcuate profile.

17 Claims, 7 Drawing Sheets

(51) Int. Cl.
  *B33Y 10/00* (2015.01)
  *B29L 31/18* (2006.01)
  *B33Y 50/02* (2015.01)
  *B33Y 80/00* (2015.01)
  *B33Y 30/00* (2015.01)
  *B33Y 50/00* (2015.01)

(56) References Cited

U.S. PATENT DOCUMENTS

| | | |
|---|---|---|
| 10,391,709 B2 | 8/2019 | Morovic |
| 2016/0096318 A1* | 4/2016 | Bickel .................... B33Y 30/00 425/150 |
| 2018/0195775 A1* | 7/2018 | Schroeder ............... B22F 10/20 |
| 2020/0272131 A1* | 8/2020 | Wang .................... B29C 64/386 |

* cited by examiner

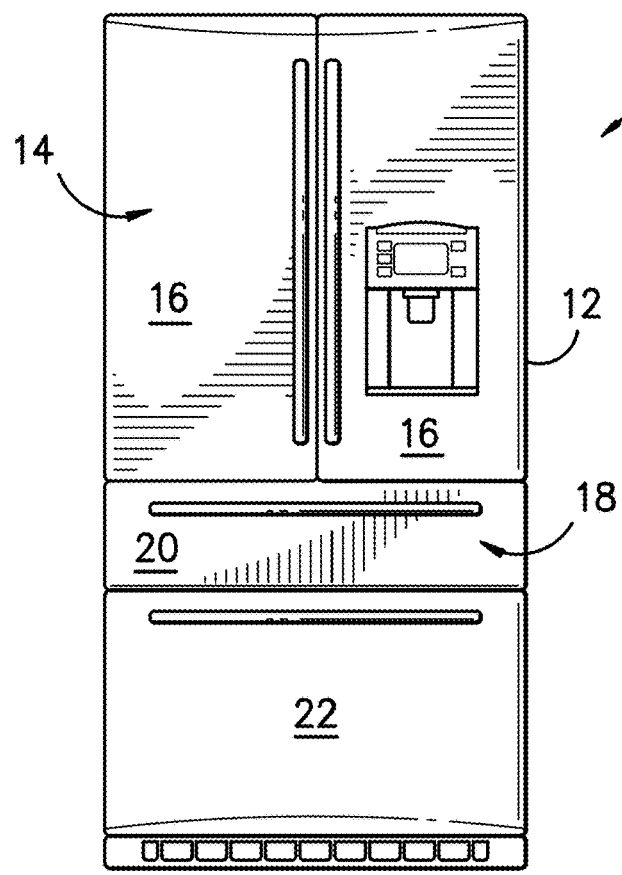
FIG. -1-
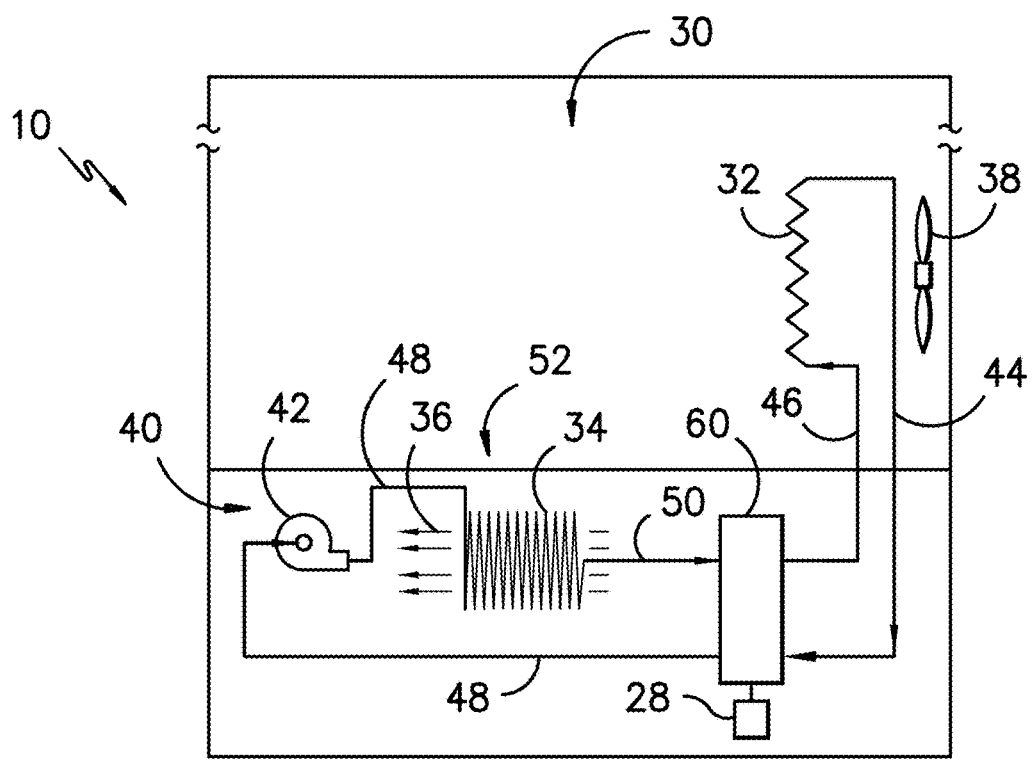
FIG. -2-

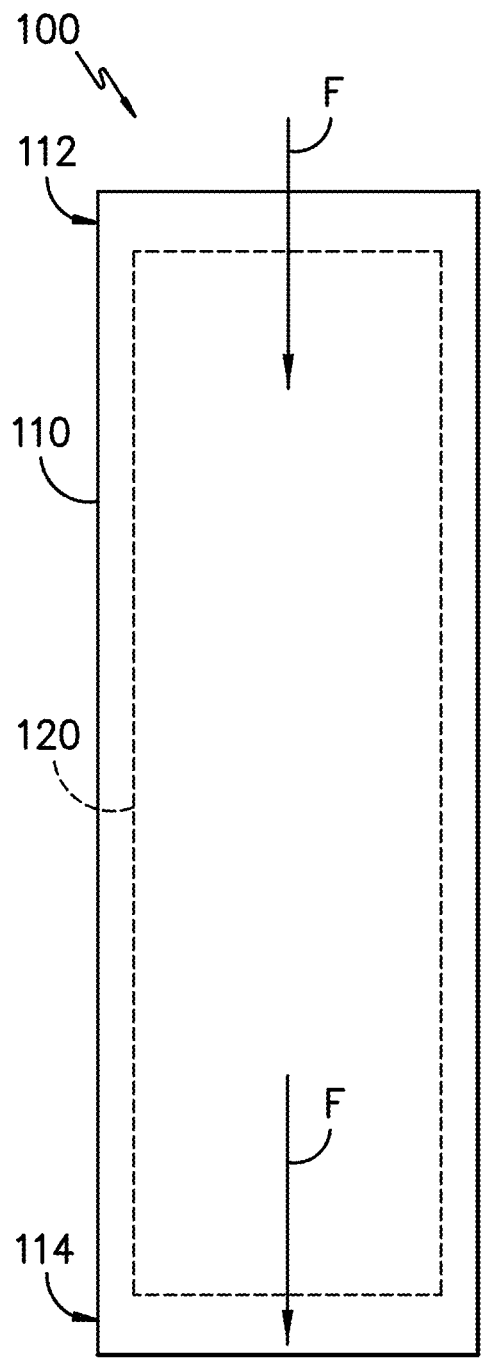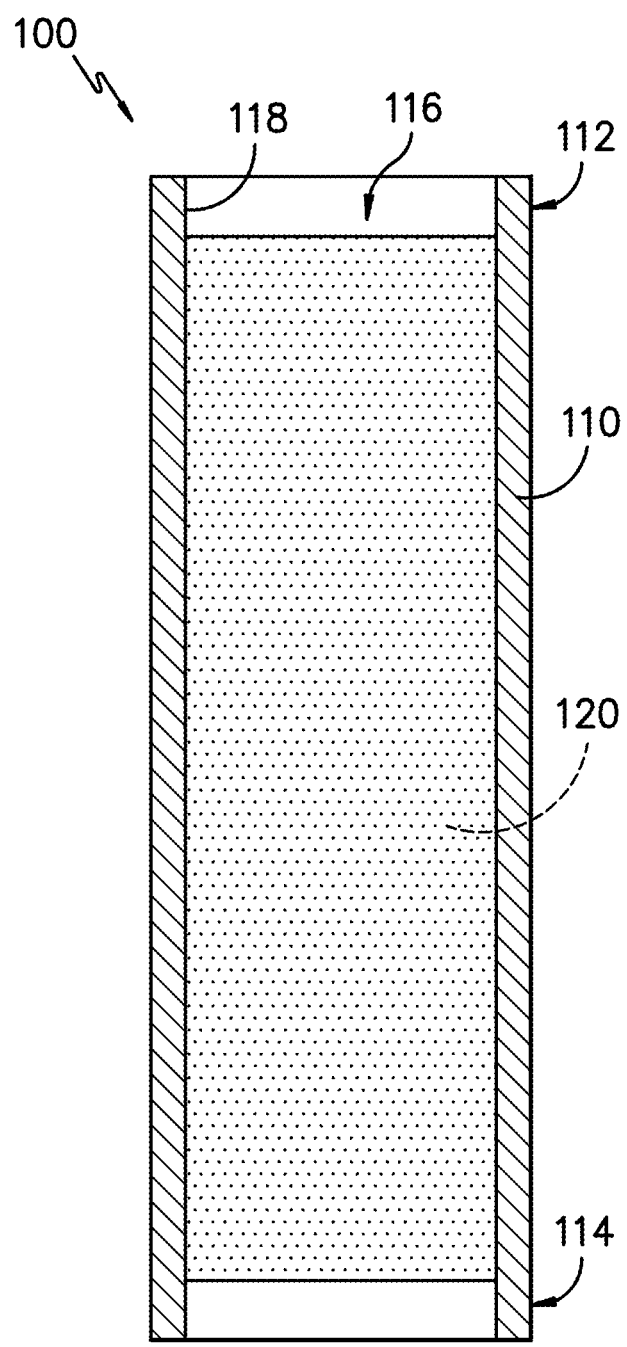
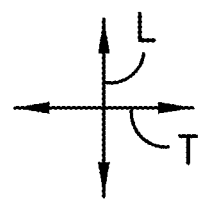
FIG. -3-
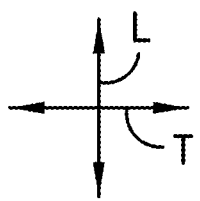
FIG. -4-

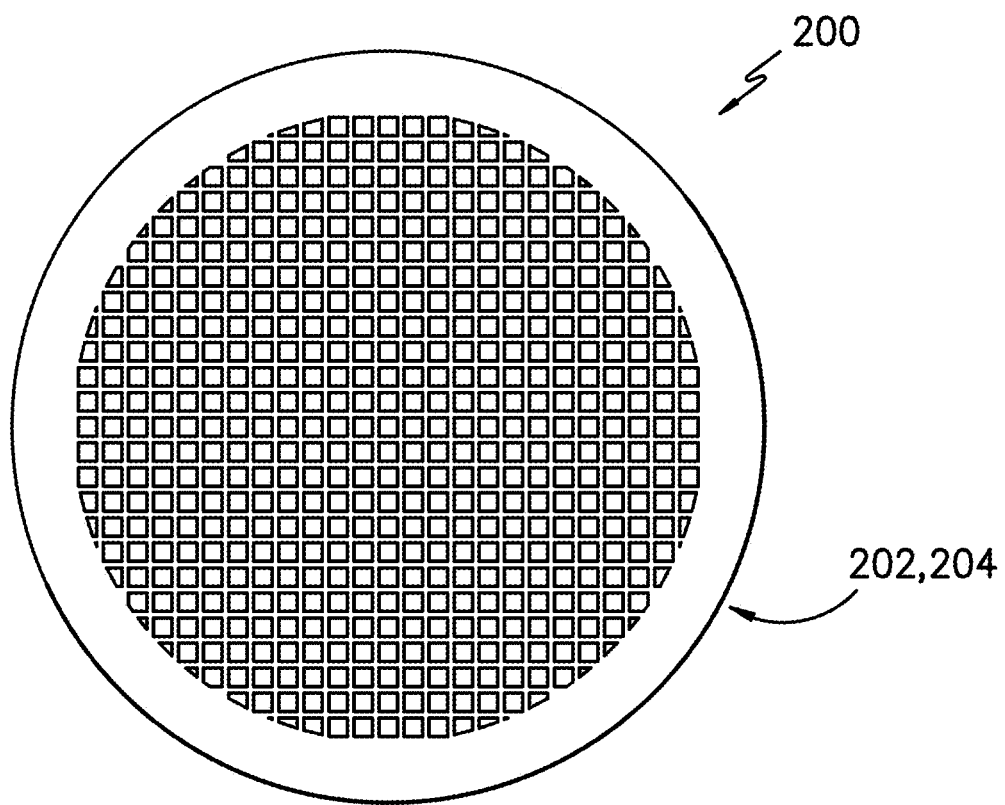
FIG. -5-
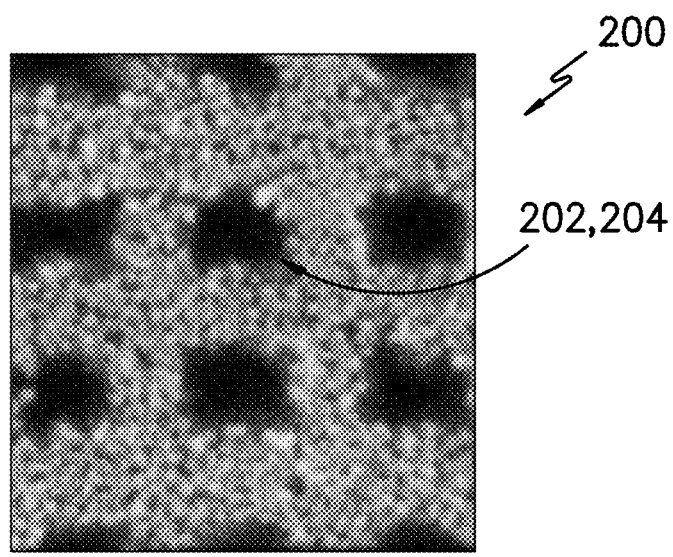
FIG. -6-

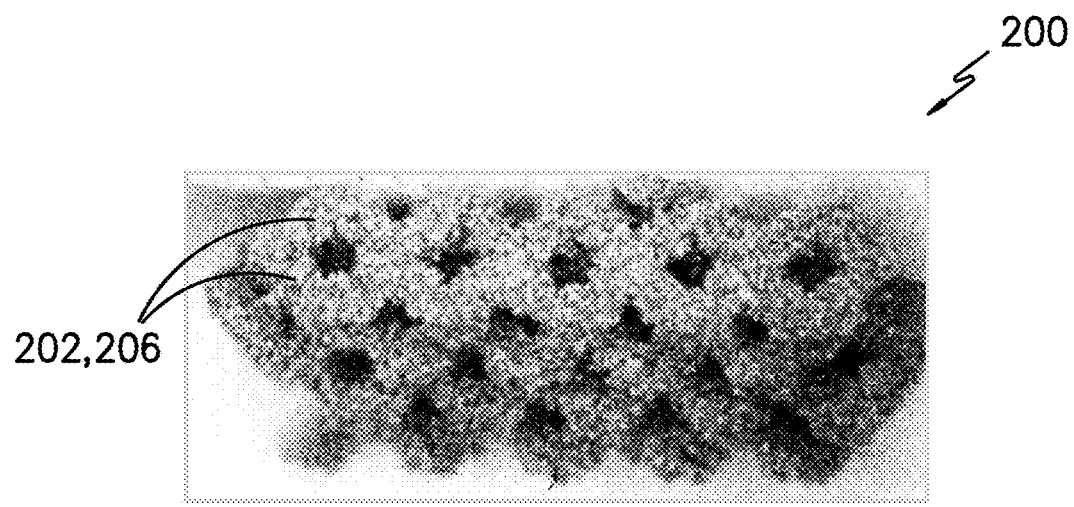
FIG. -7-
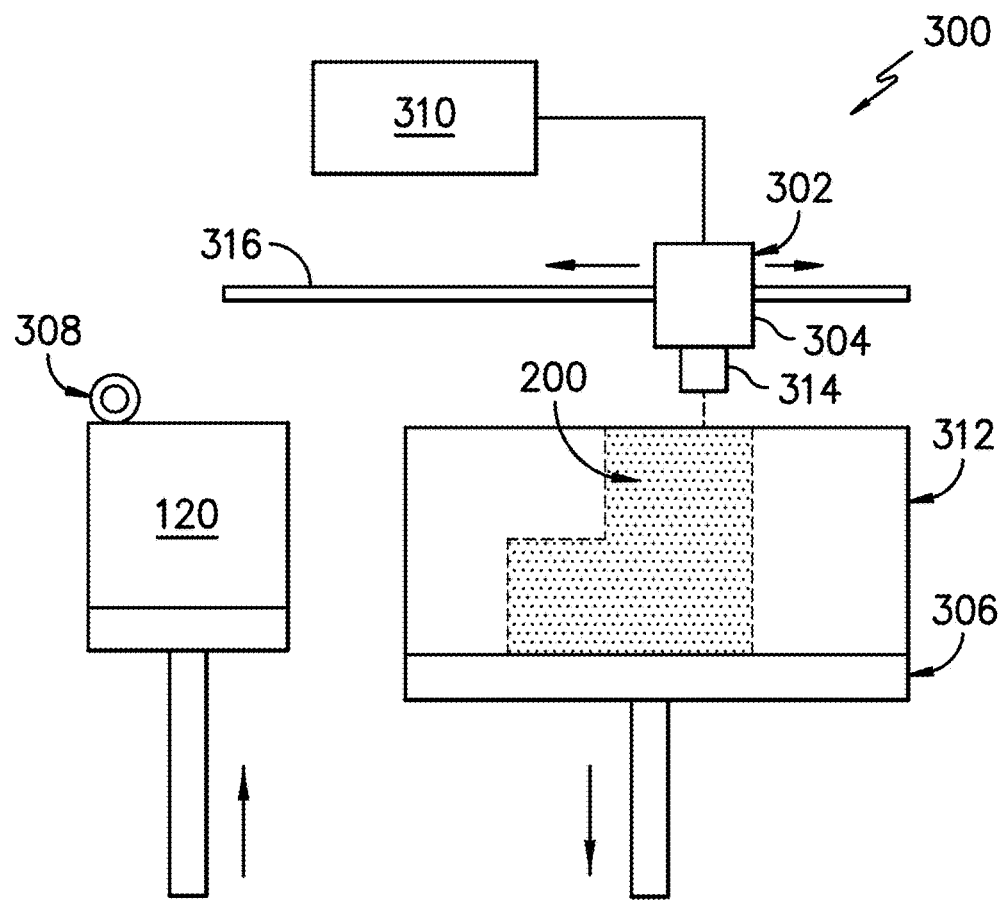
FIG. -8-

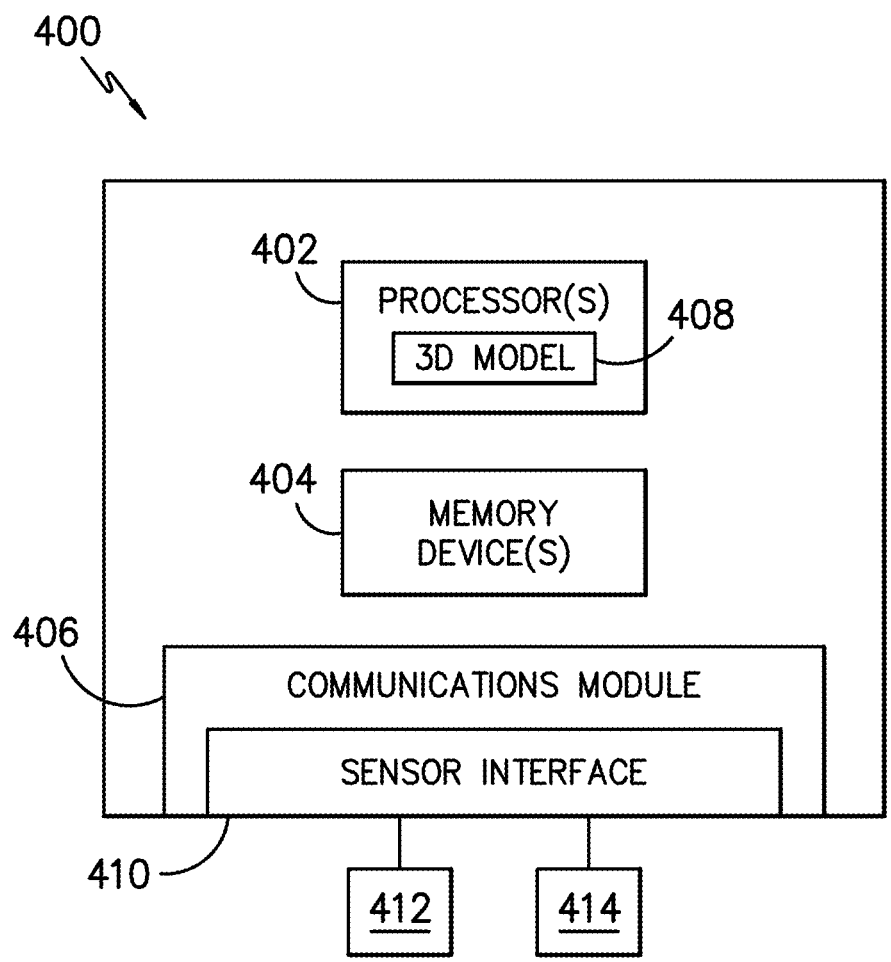
FIG. -9-

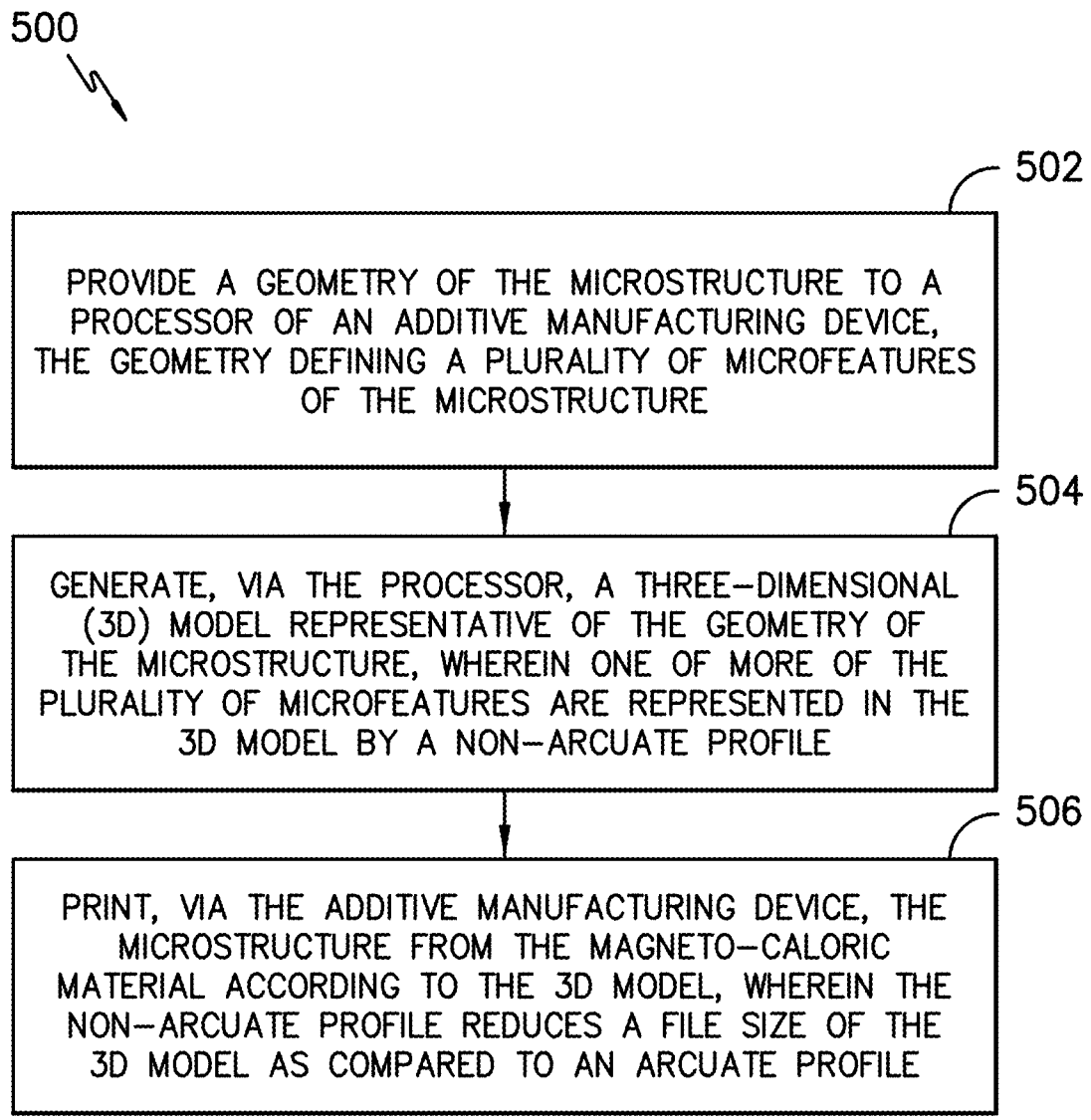
FIG. -10-

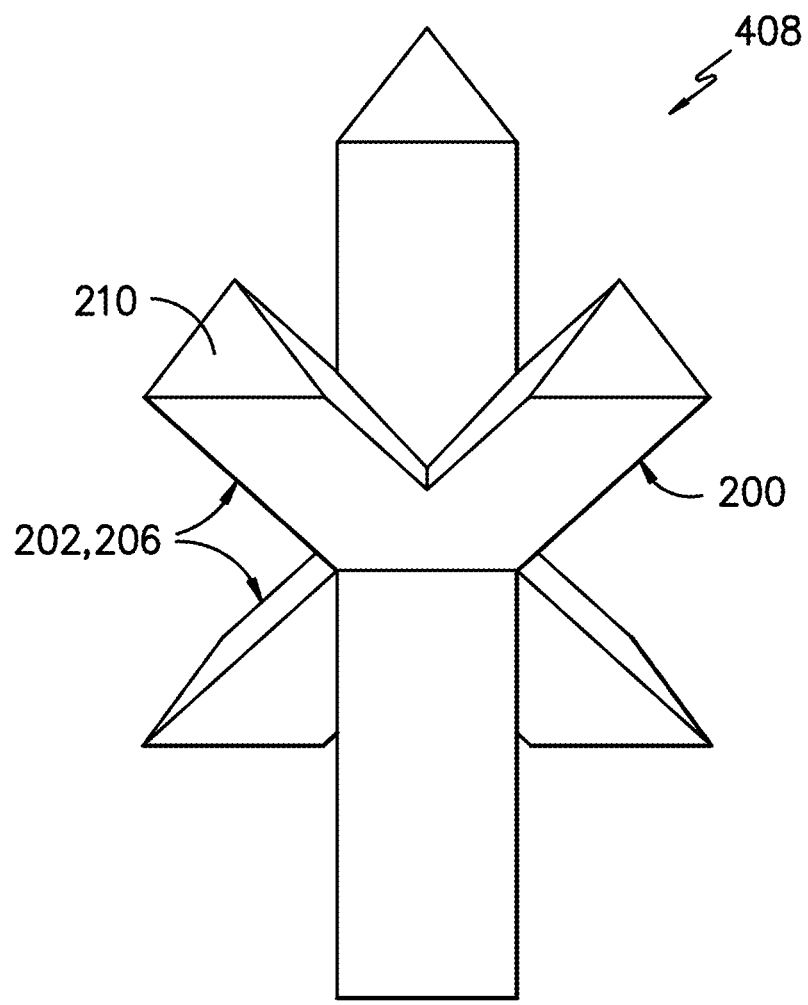
FIG. -11-

SYSTEMS AND METHODS FOR ADDITIVELY MANUFACTURING CALORIC MICROSTRUCTURES

STATEMENT REGARDING FEDERALLY SPONSORED RESEARCH AND DEVELOPMENT

This invention was made with government support under Contract No. DC-AC05-00OR22725 awarded by the U.S. Department of Energy. The government has certain rights in the invention.

FIELD OF INVENTION

The present disclosure relates generally to systems and methods for additively manufacturing microstructures from caloric materials.

BACKGROUND OF THE INVENTION

Conventional refrigeration technology typically utilizes a heat pump that relies on compression and expansion of a fluid refrigerant to receive and reject heat in a cyclic manner so as to cause a desired temperature change or i.e. transfer heat energy from one location to another. This cycle can be used to provide e.g., for the receiving of heat from a refrigeration compartment and the rejecting of such heat to the environment or a location that is external to the compartment. Other applications include air conditioning of residential or commercial structures. A variety of different fluid refrigerants have been developed that can be used with the heat pump in such systems.

While improvements have been made to such heat pump systems that rely on the compression of fluid refrigerant, at best such can still only operate at about forty-five percent or less of the maximum theoretical Carnot cycle efficiency. Also, some fluid refrigerants have been discontinued due to environmental concerns. The range of ambient temperatures over which certain refrigerant-based systems can operate may be impractical for certain locations. Other challenges with heat pumps that use a fluid refrigerant exist as well.

Magneto-caloric materials (MCMs), i.e. materials that exhibit the magneto-caloric effect, provide a potential alternative to fluid refrigerants for heat pump applications. In general, the magnetic moments of an MCM will become more ordered under an increasing, externally applied magnetic field and cause the MCM to generate heat. Conversely, decreasing the externally applied magnetic field will allow the magnetic moments of the MCM to become more disordered and allow the MCM to absorb heat. Some MCMs exhibit the opposite behavior, i.e. generating heat when the magnetic field is removed (which are sometimes referred to as para-magneto caloric material but both types are referred to collectively herein as magneto-caloric material or MCM). The theoretical percent of Carnot cycle efficiency achievable for a refrigeration cycle based on an MCM can be significantly higher than for a comparable refrigeration cycle based on a fluid refrigerant. As such, a heat pump system that can effectively use an MCM would be useful. Still further caloric materials, such as baro-caloric materials, elasto-caloric materials, or electro-caloric materials may be useful as well.

In view of the aforementioned, improved systems and methods for manufacturing MCM structures for use in refrigeration systems could be welcomed in the art.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for additively manufacturing a microstructure from a caloric material. The method includes providing a geometry of the microstructure to a processor of an additive manufacturing device, the geometry defining a plurality of microfeatures of the microstructure. The method also includes generating, via the processor, a three-dimensional (3D) model representative of the geometry of the microstructure, wherein one or more of the plurality of microfeatures are represented in the 3D model by a non-arcuate profile. Further, the method includes printing, via the additive manufacturing device, the microstructure from the caloric material according to the 3D model. As such, the non-arcuate profile reduces a file size of the 3D model as compared to an arcuate profile.

In another aspect, the present disclosure is directed to a system for additively manufacturing a microstructure from a caloric material for a heat exchanger. The system includes an additive manufacturing device having at least one print head and at least one processor. The processor(s) is configured to perform a plurality of operations, including but not limited to receiving a geometry of the microstructure, the geometry defining a plurality of microfeatures of the microstructure, generating a 3D model representative of the geometry of the microstructure, wherein one or more of the plurality of microfeatures are represented in the 3D model by a non-arcuate profile, wherein the print head prints the microstructure from the caloric material according to the 3D model, and wherein the non-arcuate profile reduces a file size of the 3D model as compared to an arcuate profile.

In yet another aspect, the present disclosure is directed to a method for additively manufacturing a microstructure from a caloric material. The method includes providing a geometry of the microstructure to a processor of an additive manufacturing device, the geometry defining a plurality of microfeatures of the microstructure. The method also includes generating, via the processor, a 3D model representative of the geometry of the microstructure, wherein one or more of the plurality of microfeatures in the 3D model are absent of arcuate profiles. Further, the method includes printing, via the additive manufacturing device, the microstructure from the caloric material according to the 3D model. As such, the absence of arcuate profiles in one or more of the plurality of microfeatures provides for a reduced file size of the 3D model as compared to arcuate profiles.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a front view of a refrigerator appliance according to an exemplary embodiment of the present subject matter.

FIG. 2 provides a schematic illustration of certain components of a heat pump system according to an exemplary embodiment of the present subject matter positioned in an exemplary refrigerator appliance.

FIG. 3 illustrates a front, plan view of caloric material according to an exemplary embodiment of the present subject matter.

FIG. 4 provides a section view of the exemplary caloric material of FIG. 3.

FIG. 5 provides a front view of a microstructure formed of caloric particles according to an exemplary embodiment of the present subject matter.

FIG. 6 provides a detailed, cross-section of a microstructure formed of caloric particles according to an exemplary embodiment of the present subject matter.

FIG. 7 provides a partial, perspective view of a microstructure formed of caloric particles according to an exemplary embodiment of the present subject matter.

FIG. 8 provides a perspective view of an additive manufacturing device for forming a microstructure of caloric particles according to an exemplary embodiment of the present subject matter.

FIG. 9 provides a block diagram of a controller for an additive manufacturing device for forming a microstructure of caloric particles according to an exemplary embodiment of the present subject matter.

FIG. 10 provides a flow diagram of a method for additively manufacturing a microstructure from caloric particles according to an exemplary embodiment of the present subject matter.

FIG. 11 provides a partial, perspective view of a 3D model representation of the microstructure formed of the caloric particles according to an exemplary embodiment of the present subject matter.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIG. 1, an exemplary embodiment of a refrigerator appliance 10 is depicted as an upright refrigerator having a cabinet or casing 12 that defines a number of internal storage compartments or chilled chambers. In particular, refrigerator appliance 10 includes upper fresh-food compartments 14 having doors 16 and lower freezer compartment 18 having upper drawer 20 and lower drawer 22. The drawers 20, 22 are "pull-out" type drawers in that they can be manually moved into and out of the freezer compartment 18 on suitable slide mechanisms. The refrigerator 10 is provided by way of example only. Other configurations for a refrigerator appliance may be used as well including appliances with only freezer compartments, only chilled compartments, or other combinations thereof different from that shown in FIG. 1. In addition, the heat pump and heat pump system of the present subject matter is not limited to appliances and may be used in other applications as well such as e.g., air-conditioning, electronics cooling devices, and others. Thus, it should be understood that while the use of a heat pump to provide cooling within a refrigerator is provided by way of example herein, the present subject matter may also be used to provide for heating applications as well.

Referring particularly to FIG. 2, a schematic view of another exemplary embodiment of the refrigerator appliance 10 including a refrigeration compartment 30 and a machinery compartment 40 is illustrated. In particular, the machinery compartment 30 includes a heat pump system 52 having a first heat exchanger 32 positioned in the refrigeration compartment 30 for the removal of heat therefrom. A heat transfer fluid such as e.g., an aqueous solution or any other gas, liquid, molten metal, magnetic fluid, nano-fluid, etc., flowing within first heat exchanger 32 receives heat from the refrigeration compartment 30 thereby cooling its contents. A fan 38 may be used to provide for a flow of air across first heat exchanger 32 to improve the rate of heat transfer from the refrigeration compartment 30.

The heat transfer fluid flows out of the first heat exchanger 32 by line 44 to a heat pump 60. As will be further described herein, the heat transfer fluid receives additional heat from various caloric materials, such as magneto-caloric material (MCM), in heat pump 60 and carries this heat by line 48 to pump 42 and then to second heat exchanger 34. Though the description is written with respect to MCM, it should be understood that further caloric materials may be used, including but not limited to baro-caloric materials, elasto-caloric materials, or electro-caloric materials. Heat is released to the environment, machinery compartment 40, and/or other location external to refrigeration compartment 30 using second heat exchanger 34. A fan 36 may be used to create a flow of air across second heat exchanger 34 and thereby improve the rate of heat transfer to the environment. The pump 42 connected into line 48 causes the heat transfer fluid to recirculate in heat pump system 52. Motor 28 is in mechanical communication with the heat pump 60 as will further described.

From the second heat exchanger 34, the heat transfer fluid returns by line 50 to the heat pump 60 where, as will be further described below, the heat transfer fluid loses heat to the MCM in the heat pump 60. The now colder heat transfer fluid flows by line 46 to first heat exchanger 32 to receive heat from refrigeration compartment 30 and repeat the cycle as just described.

The heat pump system 52 is provided by way of example only. Other configurations of the heat pump system 52 may be used as well. For example, lines 44, 46, 48, and 50 provide fluid communication between the various components of the heat pump system 52 but other heat transfer fluid recirculation loops with different lines and connections may also be employed. For example, the pump 42 can also be positioned at other locations or on other lines in system 52. Still other configurations of the heat pump system 52 may be used as well. Further, the heat pump 60 may be any suitable heat pump with MCM. For example, the heat pump 60 may be constructed or arranged in the manner described in U.S. Patent Publication No. 2014/0165594 of Michael Alexander Benedict, which is hereby incorporated by reference in its entirety.

During operation of the heat pump 60, MCM may be exposed to a magnetic field, which causes the magnetic moments of the MCM to orient and the MCM to heat as part of the magneto-caloric effect. Ordering of the magnetic field is created and maintained while the MCM is exposed to the magnetic field such that the heat transfer fluid dwelling in the MCM is heated. In turn, the heat transfer fluid heated by the MCM can travel out of the heat pump 60 and along line 48 to the second heat exchanger 34. At the same time, heat transfer fluid from the first heat exchanger 32 flows into the MCM within the heat pump 60 from line 44. Because heat transfer fluid from the first heat exchanger 32 is relatively cooler than the MCM, the MCM will lose heat to the heat transfer fluid.

The MCM may then be moved, completely or substantially, out of magnetic field. The absence or lessening of the magnetic field is such that the magnetic moments of the material become disordered and the MCM absorbs heat as part of the magneto-caloric effect. In turn, the heat transfer fluid dwelling in the MCM is cooled by losing heat to the MCM as the magnetic moments disorder. The heat transfer fluid, now cooled by the MCM, can then travel out of heat pump 60 and along line 46 to the first heat exchanger 32. At the same time, heat transfer fluid from second heat exchanger 34 flows into heat pump 60 from line 50. Because heat transfer fluid from the second heat exchanger 34 is relatively warmer than the MCM, the MCM will lose some of its heat to the heat transfer fluid. The heat transfer fluid now travels along line 46 to the first heat exchanger 32 to receive heat and cool the refrigeration compartment 30. The above described process may be repeated such that heat pump 60 moves MCM into and out of a magnetic field in order to cool refrigeration compartment 30. A motor 28 in mechanical communication with the MCM within heat pump 60 may move the MCM into and out of the magnetic field.

The MCM within heat pump 60 may be constructed from a single magneto-caloric material or may include multiple different magneto-caloric materials. By way of example, the appliance 10 may be used in an application where the ambient temperature changes over a substantial range. However, a specific magneto caloric material may exhibit the magneto-caloric effect over only a much narrower temperature range. As such, it may be desirable to use a variety of magneto-caloric materials within a given stage to accommodate the wide range of ambient temperatures over which the appliance 10 and/or the heat pump 60 may be used.

FIG. 3 provides a front, plan view of one embodiment of magneto-caloric material 100 according to the present disclosure. FIG. 4 provides a section view of the magneto-caloric material 100 according to the present disclosure. As mentioned, the magneto-caloric material 100 may be used in or with any suitable heat pump or heat exchanger. For example, the magneto-caloric material 100 may be used in or with the heat pump 60 to transfer heat between the first and second heat exchangers 32, 34 via the heat transfer fluid within heat pump system 52. Thus, the magneto-caloric material 100 is discussed in greater detail below in the context of heat pump 60. Further, the magneto-caloric material 100 includes features for facilitating heat transfer with the heat transfer fluid within the heat pump system 52.

As shown particularly in FIG. 3, the magneto-caloric material 100 defines a longitudinal direction L and a transverse direction T. The longitudinal direction L and transverse direction T are perpendicular to each other. The magneto-caloric material 100 also includes a casing 110. The casing 110 extends between a first end portion 112 and a second end portion 114, e.g., along the longitudinal direction L. A flow of fluid F, such as the heat transfer fluid within the heat pump system 52, may enter the casing 110 at the first end portion 112 or the second end portion 114 of the casing 110 and flow through casing 110, e.g., along the longitudinal direction L. Thus, the casing 110 may contain and guide the flow of fluid F through magneto-caloric material 100 between first and second end portions 112, 114 of casing 110.

The casing 110 may be any suitable type of casing. As an example, the casing 110 may be a tubular casing, such as a tube or pipe. Further, the casing 110 may also be made of any suitable material, e.g., metallic, plastic or composite material, including non-ferrous material, such as vinyl tubing or plastic piping. Moreover, the casing 110 may have any suitable cross-section shape, e.g., in a plane that is perpendicular to the longitudinal direction L, such as circular, arcuate, etc.

As shown particularly in FIG. 4, the magneto-caloric material 100 may also include a plurality of magneto-caloric particles 120 disposed within the casing 110, e.g., the between first and second end portions 112, 114 of the casing 110 along the longitudinal direction L. In particular, the magneto-caloric particles 120 may be positioned within an interior volume 116 of the casing 110, with interior volume 116 defined by an inner surface 118 of the casing 110. With the magneto-caloric particles 120 disposed within the casing 110, the flow of fluid F through the casing 110 may flow through or over magneto-caloric particles 120. Thus, when a magnetic field engages the magneto-caloric particles 120, heat transfer between the magneto-caloric particles 120 and the flow of fluid F through the casing 110 may assist with cooling the refrigeration compartment 30, as discussed above.

It should be understood that the magneto-caloric particles 120 may be any suitable magneto-caloric particles. For example, the magneto-caloric particles 120 may include any suitable combination or alloy of: (1) gadolinium, silicon and germanium; or (2) nickel, magnesium, and gallium, etc. As another example, the magneto-caloric particles 120 may be selected from the thermomagnetic or magneto-caloric materials described in U.S. Pat. No. 8,763,407 of Carroll et al., which is incorporated by reference herein in its entirety. Further, the magneto-caloric particles 120 may have any suitable shape, such as spherical, non-spherical, elongated, wire-shape, jagged, etc. Moreover, the magneto-caloric particles 120 may also have any suitable size. For example, the magneto-caloric particles 120 may be particles between one hundred microns and one hundred and fifty microns. As another example, the magneto-caloric particles 120 may be particles between one hundred microns and four hundred and fifty microns. An aspect ratio of each individual particle may also vary between one and five hundred. Further, the magneto-caloric particles 120 may include secondary particles, such as iron, copper, brass, carbon nanotubes, graphite, etc., in certain exemplary embodiments. The secondary particles may enhance the magnetic field, thermal conductivity or both.

Referring now to FIGS. 5-8, various representations of a microstructure 200 formed of the magneto-caloric particles 120 that can be further processed to fabricate a heat exchanger according to the present disclosure are illustrated. In particular, FIG. 5 illustrates a front view of one embodiment of the microstructure 200 formed of the magneto-caloric particles 120 according to the present disclosure. FIG. 6 illustrates a detailed, cross-section of one embodiment of the microstructure 200 formed of the magneto-caloric particles 120 according to the present disclosure. FIG. 7 illustrates a partial, perspective view of one embodiment of the microstructure 200 formed of the magneto-caloric particles 120 according to the present disclosure. Though the microstructure 200 is illustrated and described as being a part of a heat exchanger, such as a regenerator of the refrigeration system 10, it should be understood that the microstructure described herein may also be a part of any other suitable system, such as a generator, a converter, or similar.

As shown generally in FIGS. 5-7, the microstructure 200 includes one or more microfeatures 202. As used herein, the term "microfeature" generally refers to a feature of the microstructure 200 having a particularly small size, e.g. as measured in microns. More specifically, as shown in FIGS. 5 and 6, the microfeature(s) 202 may include one or more microchannels 204. For example, as shown, the microstructure 200 includes a plurality of microchannels 204 arranged in an array that allow fluid F to pass therethrough. In an additional embodiment or in the alternative, as shown in FIG. 7, the microstructure 200 may have a lattice or kagome configuration. In such embodiments, as shown, the microfeature(s) 202 may include interlocking micro cross-members 206 of the lattice configuration.

In general, it is an object of the present disclosure to form the microstructures 200 described herein via three-dimensional (3D) printing. 3-D printing, as used herein, is generally understood to encompass processes used to synthesize three-dimensional objects in which successive layers of material are formed under computer control to create the objects. As such, objects of almost any size and/or shape can be produced from digital model data. Suitable 3D printing techniques that may be employed by the present disclosure may include, for example, binder jetting, electron beam melting, selective laser melting, selective laser sintering, stereolithography, digital light processing, fused deposition modeling, or any other suitable 3D printing technique.

Thus, as shown in FIG. 8, a perspective view of one embodiment of a system 300 for additively manufacturing a microstructure from a magneto-caloric material according to the present disclosure is illustrated. More specifically, as shown, the system 300 includes an additive manufacturing device 302, such as a computer numeric control (CNC) device, having at least one print head 304. For example, in one embodiment, the CNC device 302 may be a 3-D printer that can be used for 3-D printing an object. Further, as shown, the print head 304 (or extruder) may include a print nozzle 314 mounted to a gantry 316 or frame structure such that the print head 304 can move in multiple directions. Moreover, in the embodiment of FIG. 8, the system 300 corresponds to a binder jetting system. Thus, as shown, the magneto-caloric particles/powder 120 can be spread over a build platform 306 using a roller 308. Further, the print head 304 deposits the binder adhesive 310 on top of the powder 120 where required. Moreover, as shown, the build platform 306 is lowered by the model's layer thickness (as set forth in the processor of the device 302). Another layer of powder 120 is spread over the previous layer and the microstructure 200 is formed where the powder 120 is bound to the liquid. As shown by reference character 312, unbound powder remains in position surrounding the object. The process is repeated until the entire microstructure 200 has been made.

Referring now to FIG. 9, a block diagram of one embodiment of a controller 400 configured to control the additive manufacturing device 302 described herein is illustrated. As shown, the controller 400 may include one or more processor(s) 402 and associated memory device(s) 404 configured to perform a variety of computer-implemented functions (e.g., performing the methods, steps, calculations and the like and storing relevant data as disclosed herein). Additionally, the controller 400 may also include a communications module 406 to facilitate communications between the controller 400 and the various components of the additive manufacturing device 302. For example, as shown, the processor(s) 402 may include a three-dimensional (3D) model 408 stored therein representative of a geometry of the microstructure 200 that can be used by the controller 400 to form the microstructure 200. In particular, and as will be described in more detail herein, the geometry defines the microfeature(s) 202 of the microstructure 200 as described herein as having at least one non-arcuate profile (i.e., rather than arcuate profiles).

Further, the communications module 406 may include a sensor interface 410 (e.g., one or more analog-to-digital converters) to permit signals transmitted from one or more sensors 412, 414, if applicable, to be converted into signals that can be understood and processed by the processor(s) 402. It should be appreciated that the sensors may be communicatively coupled to the communications module 406 using any suitable means. For example, as shown in FIG. 9, the sensors 412, 414 may be coupled to the sensor interface 410 via a wired connection. However, in other embodiments, the sensors 412, 414 may be coupled to the sensor interface 410 via a wireless connection, such as by using any suitable wireless communications protocol known in the art. As such, the processor(s) 402 may be configured to receive one or more signals from the sensor(s).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor(s) 402 is also configured to compute advanced control algorithms and communicate to a variety of Ethernet or serial-based protocols (Modbus, OPC, CAN, etc.). Additionally, the memory device(s) 404 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 404 may generally be configured to store suitable computer-readable instructions that, when implemented by the processor(s) 402, configure the controller 400 to perform the various functions as described herein.

In particular, and referring now to FIG. 10, a flow diagram of one embodiment of a method 500 for additively manufacturing a microstructure from a magneto-caloric material is illustrated. In general, the method 400 will be described herein with reference to the microstructures 200 shown in FIGS. 5-7. However, it should be appreciated that the disclosed method 500 may be implemented to form other similar microstructures having any other suitable configurations. In addition, although FIG. 10 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (502), the method 500 includes providing a geometry of the microstructure 200 to the processor(s) 402 of the additive manufacturing device 302. For example, as shown in FIGS. 5-7, the geometry of the microstructure 200 may generally define one or more microfeatures 202 of the microstructure 200. Thus, referring back to FIG. 10, as shown at (504), the method 500 includes generating, via the processor(s) 402, a 3D model 408 representative of the geometry of the microstructure 200. Accordingly, the processor(s) 402 can then analyze the geometry of the microstructure 200 (such as the shapes illustrated in FIGS. 5-7) and simplify such shapes so that the microfeature(s) 202 are represented in the model 408 as a non-arcuate profile, i.e. rather than an arcuate profile, so as to reduce the file size of the 3D model 408. In particular, as shown in FIG. 11, the processor(s) 402 generates the model with the microfeature(s) 202 being represented by a non-arcuate profile 210.

In further embodiments, the microfeature(s) 202 of the microstructure 200 may include only non-arcuate profiles as opposed to arcuate or round profiles. In such embodiments, the 3D model 408 may be absent of arcuate profiles. Though in other embodiments, it should be understood that the 3D model 408 may simply include a lesser number of arcuate profiles. For example, in particular embodiments, as mentioned and described herein, wherein the microstructure 200 has a lattice configuration, one or more of the interlocking micro cross-members 206 may have a non-arcuate cross-sectional profile. In addition, or in the alternative, the microchannel(s) 204 described herein may also include a non-arcuate cross-sectional profile.

As used herein, a non-arcuate cross-section or profile generally refers to a profile having sharp rather than round edges. Example non-arcuate profiles may define, for example, a polygon. More specifically, suitable polygonal shapes may include a triangle, a quadrilateral, a pentagon, a hexagon, a heptagon, or an octagon. Still further polygonal shapes may be suitable, though it is generally understood that as the number of sides of a shape increase, so does the file size.

Referring still to FIG. 10, as shown at (506), the method 500 includes printing, via the additive manufacturing device 302, the microstructure 200 from the magneto-caloric material 100 according to the 3D model 408. As such, the non-arcuate profile(s) (or the absence of arcuate profiles) reduces a file size of the 3D model 408, i.e. as compared to using an arcuate profile. Accordingly, since the process for printing magneto-caloric powders is dependent on the file size being below a threshold memory size (limited by the processor(s) 402 of the additive manufacturing device 302), the present disclosure allows for printing 3D microstructures that would otherwise have very large file sizes incapable of being handled by the device 302. Though the final shape of the printed microstructure is less ideal, the final printed part is not substantially changed by the new representation due to the small size scale (i.e. near the limit of 3D printing).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for additively manufacturing a microstructure from a caloric material, the method comprising:
   providing a geometry of the microstructure to a processor of an additive manufacturing device, the geometry defining a plurality of microfeatures arranged together to form the microstructure;
   generating, via the processor, a three-dimensional (3D) model representative of the geometry of the microstructure, wherein one or more of the plurality of microfeatures has an arcuate cross-sectional shape;
   analyzing and simplifying, via the processor, the geometry of the microstructure in the 3D model by replacing the arcuate cross-sectional shape of the one or more of the plurality of microfeatures with a non-arcuate cross-sectional shape; and
   printing, via the additive manufacturing device, the microstructure from the caloric material according to the 3D model,
   wherein the non-arcuate cross-sectional shape reduces a file size of the 3D model as compared to the arcuate cross-sectional shape.

2. The method of claim 1, wherein all of the plurality of microfeatures are represented in the 3D model by the non-arcuate cross-sectional shape.

3. The method of claim 1, wherein the microstructure has a lattice configuration, the plurality of microfeatures comprising interlocking micro cross-members of the lattice configuration.

4. The method of claim 1, wherein the plurality of microfeatures comprise a plurality of microchannels.

5. The method of claim 1, wherein the non-arcuate cross-sectional shape defines a polygon.

6. The method of claim 5, wherein the polygon comprises one of a triangle, a quadrilateral, a pentagon, a hexagon, a heptagon, or an octagon.

7. The method of claim 1, wherein the printing comprises at least one of binder jetting, electron beam melting, selective laser melting, selective laser sintering, stereolithography, digital light processing, or fused deposition modeling.

8. The method of claim 1, wherein the microstructure is part of at least one of a heat exchanger, a generator, or a converter.

9. The method of claim 8, wherein the heat exchanger is a regenerator of a refrigeration system.

10. The method of claim 1, wherein the caloric material comprises at least one of a magneto-caloric material, a baro-caloric material, an elasto-caloric material, or an electro-caloric material.

11. A method for additively manufacturing a microstructure from a caloric material, the method comprising:
    providing a geometry of the microstructure to a processor of an additive manufacturing device, the geometry defining a plurality of microfeatures of the microstructure;
    generating, via the processor, a three-dimensional (3D) model representative of the geometry of the microstructure, wherein one or more of the plurality of microfeatures has an arcuate cross-sectional shape;
    analyzing and simplifying, via the processor, the geometry of the microstructure in the 3D model by replacing the arcuate cross-sectional shape of the one or more of the plurality of microfeatures with a non-arcuate cross-sectional shape; and
    printing, via the additive manufacturing device, the microstructure from the caloric material according to the 3D model, wherein replacing the arcuate cross-sectional shape in one or more of the plurality of microfeatures in the 3D model with the non-arcuate cross-sectional shape provides for a reduced file size of the 3D model.

12. The method of claim 11, wherein all of the plurality of microfeatures in the 3D model are absent of cross-sectional shapes.

13. The method of claim 11, wherein the microstructure has a lattice configuration, the plurality of microfeatures comprising interlocking cross-members of the lattice configuration.

14. The method of claim 11, wherein the plurality of microfeatures comprise a plurality of microchannels.

15. The method of claim 14, wherein the non-arcuate cross-sectional shape defines a polygon.

16. The method of claim 15, wherein the polygon comprises one of a triangle, a quadrilateral, a pentagon, a hexagon, a heptagon, or an octagon.

17. The method of claim 11, wherein the printing comprises at least one of binder jetting, electron beam melting, selective laser melting, selective laser sintering, stereolithography, digital light processing, or fused deposition modeling.

\* \* \* \* \*